United States Patent [19]
Polcyn

[11] Patent Number: 5,951,633
[45] Date of Patent: Sep. 14, 1999

[54] SYSTEM AND METHOD FOR OVERFLOW RESOURCE ALLOCATION

[75] Inventor: Michael J. Polcyn, Allen, Tex.

[73] Assignee: InterVoice Limited Partnership, Reno, Nev.

[21] Appl. No.: 08/767,525

[22] Filed: Dec. 16, 1996

[51] Int. Cl.[6] ........................................... G06F 9/00
[52] U.S. Cl. ........................... 709/104; 709/100; 380/4
[58] Field of Search .............................. 395/670; 705/8; 380/4, 25; 709/100, 104

[56] References Cited

U.S. PATENT DOCUMENTS

| | | | |
|---|---|---|---|
| 4,937,863 | 6/1990 | Roberts | 380/4 |
| 5,438,508 | 8/1995 | Wyman | 705/8 |
| 5,579,222 | 11/1996 | Bains et al. | 395/712 |

OTHER PUBLICATIONS

Aug. 1998, PCT/US97/22696—International Search Report—U.S. Patent Office.

Primary Examiner—Majid A. Banankhah
Attorney, Agent, or Firm—Fulbright & Jaworski L.L.P.

[57] ABSTRACT

A system and method for allowing use of an overflow resource on a temporary basis to supplement a standard resource that is engaged, and thus allows the system to satisfy a resource access request that would otherwise go unresponsed. The system monitors usage of the standard resource to determine if the standard resource is engaged when the request materializes, and then authorizes use of the overflow resource when the standard resource is engaged. The system then activates the overflow resource, whereby the overflow resource responds to the access request. The system then disables the overflow resource when the request is satisfied or when the standard resource becomes available. The system monitors the use of the overflow resource and when the use exceed a predetermined amount of allowed use, either allocates additional overflow resources or licenses the overflow resource, essentially converting the overflow resource to a standard resource.

49 Claims, 1 Drawing Sheet

SYSTEM AND METHOD FOR OVERFLOW RESOURCE ALLOCATION

TECHNICAL FIELD OF THE INVENTION

This invention relates in general to software security and in particular to multi-function software enabling with multiple performance capacity levels.

BACKGROUND OF THE INVENTION

Related prior art systems use software security to enable/disable specific functions via encryption mechanisms, blocking mechanisms and certain software functions. For example, a purchaser is sold a very large fully featured piece of software, but the purchaser does not want or require all of the features. The unwanted features are selectively disabled in that software. This reduced feature software would have a discounted purchase price. Then later on, the purchaser has a need for some of the disabled software features. The purchaser contacts the seller or the software originator and requests activation of the disabled feature(s). The purchaser pays an additional fee and then the seller or originator activates the feature(s).

This type of upgradeable software is currently available in the industry today. Specifically, in the telecommunications and IVR industries, because of the difficulty with hardware on-site upgrades and maintenance requirements, the desirable methodology is to use software enabled or upgrades, rather than anticipating and allowing for the installation of additional hardware.

A major problem is that this system is binary, i.e. the purchaser either has the feature or does not have the feature. So that even if the purchaser needs the feature for only a minor amount of time, e.g. 2 minutes per 24 hour time period, the purchaser must still buy the feature. or example, a major software developer distributed a CD ROM disk storing every piece of software that they produce. A purchaser of that CD ROM would then call a telephone number, and place an order for particular programs and features. The developer would then give you the code to unlock the requested programs and features for use.

Another problem with this binary system is that once the additional feature has be enabled, it cannot be disabled. Specifically, the purchaser cannot have the feature be re-disabled, once the purchaser buys it. For example, many 'shareware' programs are distributed free of charge, but to acquire the more advanced features, the user contacts the program originator and pays a fee. The user cannot obtain a refund when finished with the advanced features.

A further problem with this binary system is that acquisition of the additional feature(s) is not instantaneous. Thus, operations must cease while the purchaser contacts the seller or originator for obtaining the desired additional features. In both of the examples described above, the purchaser must call the seller or originator and then pay a fee, before being allowed access to the features.

SUMMARY OF THE INVENTION

The above, and other needs, are met by using of the inventive multistate program option, or overflow usage system. The overflow usage system would operate in conjunction with enabling mechanisms, so that instead of only a binary mode system, where either the feature is enabled or disabled, the system allows a tri-state or multistate operation so that an overflow usage is permitted.

The overflow usage allows purchasers of the system to gain access to extra system capacity or features on an instantaneous basis. This access to the extra capacity or features would be on a temporary basis. The purchaser would be charged a fee for using the extra capacity or features, but not the purchase price. For example, if the purchaser needs the extra capacity or feature only 5% of the time to cover peak loads, they would be charged only for the 5% percent usage and not for the out-right purchase of the extra capacity or the feature.

The system has monitoring mechanisms that meter the usage of the extra capacity or features. The monitoring mechanisms can be adapted so that any usage over that allowed overflow usage would result in the complete sale of the extra capacity or feature, and the purchaser would be given the full license to the feature. This is a tri-state arrangement.

The monitoring mechanisms also can be adapted so that any usage over that allowed overflow usage would result in switching to another overflow state. For example, the overflow usage applies to the time usage of a disabled feature of a program, with 5% being the first overflow stage. Thus, the purchaser can use the feature for 5% of the time and be charged accordingly. If the purchaser exceeds the 5%, instead of outright purchase of the feature which would happen under the tri-state mode, the purchaser would be charged a higher amount for the next 5%, i.e. 5–10% usage. This could progress with greater and greater increments until the charged amount equals the purchase price, at which time the purchaser is licensed the feature. This could also progress to a point below the purchase price, set by the originator, at which time the purchaser is licensed the feature.

The overflow usage could apply to access to additional features, additional capacity or time usage of the features or capacity. For example, the overflow usage could apply to additional telephone lines. The purchaser may not actually use the additional lines, but the purchase desires the additional lines for special events in anticipation of the actual use. Another example, is a feature on a software program, where the purchaser is charged for the actual time that the feature is used. The agent or overflow resource in this example is more of a metered feature, i.e. pay for it as it is needed.

A technical advantage of the present invention is to allocate the overflow resource to the system, monitor usage of the standard resource to determine if the standard resource is engaged when the request materializes, authorize use of the overflow resource when the standard resource is engaged, activate the overflow resource whereby the overflow resource responds to the access request, and disable the overflow resource when the request is satisfied.

Another technical advantage of the present invention is to disable the overflow resource when the standard resource becomes available.

A further technical advantage of the present invention is to use the overflow resource for peak system use and to use the standard resource for average system use.

A further technical advantage of the present invention is to restrict the use of the overflow resource to a predetermined amount and to monitor the use of the overflow resource to determine if the amount is exceeded.

A further technical advantage of the present invention is to monitor for a maximum number of uses that the overflow resource may be used; for a maximum amount of time that the overflow resource may be used; or a maximum number of uses that the overflow resource may be used per a unit of time.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
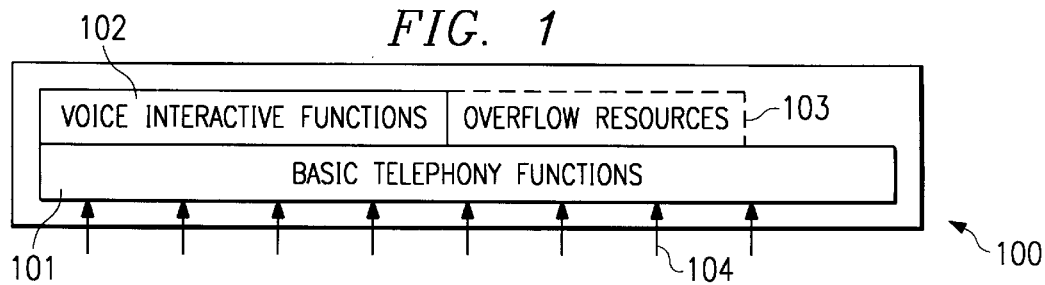
FIG. 1 is a schematic diagram of the inventive overflow agent as used in a voice interactive telephone system.

FIG. 1 depicts a simplified diagram of the concept as applied to a voice activated telephony system 100. The system 100 has two basic sets of functions, a basic telephony function 101 and voice interactive function 102. The basic telephony function is available on every port 104 in the system 100. This allows the ability to take and answer a call on every port. Some of these ports, the number of which is selected by statistical usage, are configured for the voice interactive function 102. This allows voice prompting, enunciated messages, and so on, at these ports. In certain instances it is desirable to increase the number of ports that are configured for the voice interactive function.

Without any shortage management system, in even the prior art binary method, whenever the availability of the resource is exceeded, the user is cut off, specifically the user does not obtain access to the additional needed resource. With the binary method, the user has the choice of being cut off or purchasing the full license to the additional voice interactive capacity.

The present invention allows for the use of overflow resources, specifically in this example, the voice interactive functions, and it allocates some additional number of ports as the overflow resources. In the system for this option, the user is not charged the full license price, but some lesser price. This enables the user to overflow into those additional resources for some limited period of time, time being measured statistically. The overflow usage is a metered function, so the function would be a percent of usage over unit time. If the use exceeds the allocated overflow usage, then the user would have to go back and purchase the full license. This is the tri-star method.

In the multi-state method, instead of purchasing the full license at this point, the user would enter into another overflow allotment, and is charged a higher price than the first allotment, but still less than the full license price. If this second allotment is exceeded then the user may enter a third allotment or pay the full license price depending on how the system is structured by the seller or originator.

Figure 2:
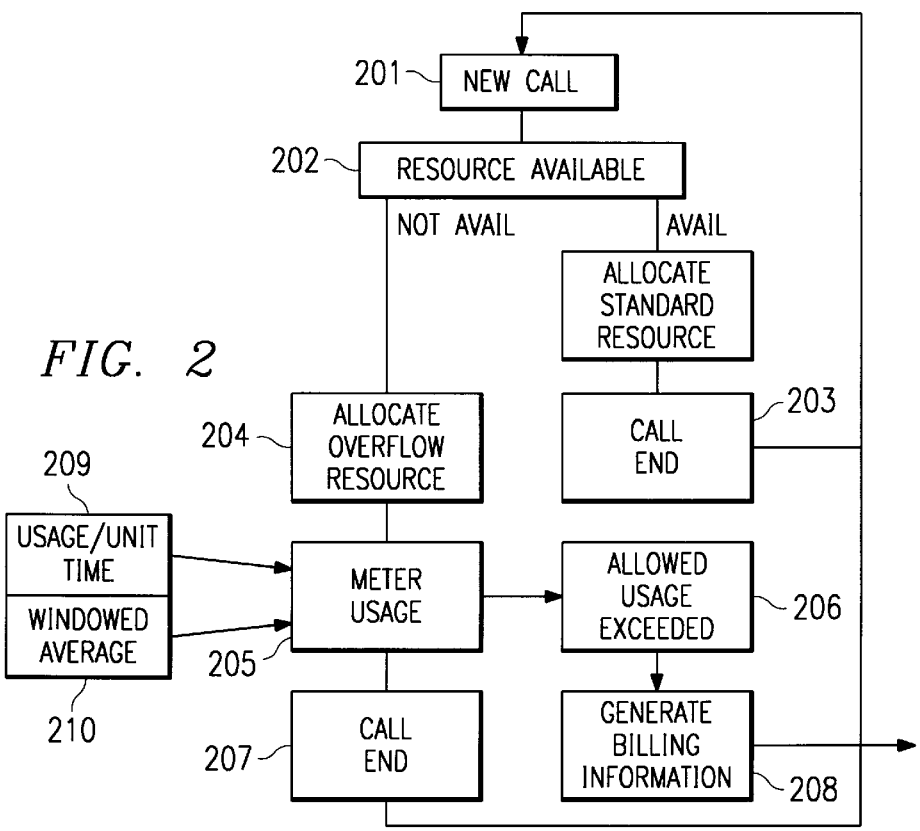
FIG. 2 is a flow chart depicting the operation of the overflow agent of FIG. 1.

FIG. 2 depicts a generalized flow chart for the operation of the system of FIG. 1. On a call-by-call basis, a new call 201 would come into the system 100. The system distributes the new call to the interactive functions 102 according to standard resource 202. If the resource is available, the call is linked to the available function 102 until the call ends 203, then the system resets back to the next new call 201. If the resource is not available, the overflow to resources are activated and the call is allocated to the overflow resource 103 by function 204.

The overflow usage is metered 205. This metering can be accomplished in a number of ways. One way is a usage per unit time as a finite number 209. As described before, the method of metering measures how often the overflow usage is used per unit time. A second method is a windowed average 210 of usage per unit time. In this method, the amount of overflow resources is averaged over a period of time. Thus, the amount of overflow resources used is structured in the method. Other metering methodologies may be used.

If the allowed usage is exceeded 206, an invoice or other indication to signify overuse, 208 is generated whereby the user has purchased the full license to the overflow resources. If the call does not exceed the overflow resources, the call is linked to the overflow resources until the call ends 207. The system then resets back to the next new call.

This invention allows users to handle spurious peaks in system operations without having to pre-purchase the system for maximum capacity. In other words, users can configure systems for average usage instead of peak usage.

The user of the overflow agent has purchased the capability of using the overflow resources for some portion of a period of time, and if this is exceeded, then the user has to buy the resources.

Figure 3:
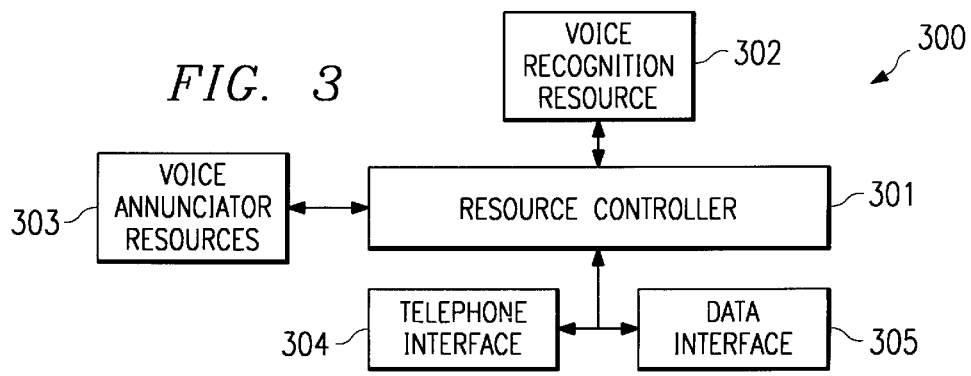
FIG. 3 is a schematic diagram of voice resources and the overflow agent of FIG. 1.

FIG. 3 depicts a schematic diagram of a voice resource and the overflow agent. The system 300 has voice recognition resources 302 and voice annunciator resources comprise voice interactive functions 102. The voice recognition resources 302 convert voice or spoken data into a text or computer data usable by the system. The voice annunciator resources 303 convert computer data into voice data understandable by a caller. The telephone interface 304 and the data interface 305 connect the system 300 and the data interface 305 connect the system 300 to the parts 104. The parts can be a telephone link to a telephony system or to a modem-based computer system. The parts can also be links to data systems such as a LAN, ISDN, other intranet, or the internet.

The resource controller 301 performs the allocation, auditing and metering functions of the overflow agent system 300. The controller uses a software locking mechanism or dongle that only allows the use of what is configured in the dongle. A dongle is a hardware security code that is tied to a software file in the system. Thus, the system has the physical capabilities to do more, but through a software locking mechanism, the unpaid portion is disabled. The dongle stores the enabled parts and the overflow part IDs.

In one instance, the dongle may be mounted on the parallel port of the computer system and it has a stored code. The code is an encrypted key word and is linked to a file that is stored in the machine. The system needs that code to be able to decode the file to configure the system. An encrypted file on the system or a background process that would monitor system usage would also work instead of the dongle.

Although the present invention and its advantages have been described in detail, it should be understood that various changes, substitutions and alterations can be made herein without departing from the spirit and scope of the invention as defined by the appended claims.

What is claimed is:

1. A method for providing a system with an overflow resource on a temporary basis that allows the system to satisfy a resource access request, the method comprising the steps of:

allocating the overflow resource to the system to supplement a standard resource;

monitoring the standard resource to determine if the standard resource is engaged when the request materializes;

authorizing use of the overflow resource when the standard resource is engaged;

activating the overflow resource when the standard resource is engaged whereby the overflow resource responds to the access request; and disabling the overflow resource when the request is satisfied.

2. The method of claim 1, further comprising the step of:

disabling the overflow resource when the standard resource becomes available.

3. The method of claim 1, wherein the step of authorizing further comprises the step of:

restricting an amount of use of the overflow resource.

4. The method of claim 3, wherein the step of restricting further comprises the step of:

licensing the overflow resource if the amount of use of the overflow resource exceeds a predetermined amount.

5. The method of claim 3, wherein the step of restricting further comprises the steps of:

allocating another overflow resource to the system;

authorizing use of said another overflow resource when the amount of use of the overflow resource exceeds a predetermined amount;

activating said another overflow resource whereby said another overflow resource responds to the access request; and disabling said another overflow resource when the request is satisfied.

6. The method of claim 5, wherein the step of authorizing further comprises the step of:

restricting an amount of use of said another overflow resource.

7. The method of claim 6, wherein the step of restricting further comprises the step of:

licensing both overflow resource and said another overflow resource if the amount of use of said another overflow resource exceeds a predetermined amount.

8. The method of claim 1, further comprising the steps of:

restricting the use of the overflow resource to a predetermined amount; and monitoring the use of the overflow resource to determine if the amount is exceeded.

9. The method of claim 8, wherein the predetermined amount has units of time.

10. The method of claim 8, wherein the predetermined amount represents a maximum number of uses that the overflow resource may be used.

11. The method of claim 8, wherein the predetermined amount represents a maximum amount of time that the overflow resource may be used.

12. The method of claim 8, wherein the predetermined amount represents a maximum number of uses that the overflow resource may be used per a unit of time.

13. The method of claim 8, wherein the predetermined amount represents a maximum number of uses that the overflow resource may be used per a windowed average time unit.

14. The method of claim 8, wherein the predetermined amount represents both a maximum number of uses that the overflow resource may be used and a maximum amount of time that the overflow resource may be used.

15. The method of claim 1, further comprising the steps of:

configuring the standard resource for average system use; and configuring the overflow resource for peak system use.

16. The method of claim 1, wherein the step of authorizing comprises a step selected from the group consisting of:

enabling a hardware dongle, releasing a key to decrypt an encrypted file, and unlocking a background process.

17. A system that uses an overflow resource on a temporary basis that allows the system to satisfy a resource access request, the system comprising:

means for allocating the overflow resource to the system to supplement a standard resource;

means for monitoring the standard resource to determine if the standard resource is engaged when the request materializes;

means for authorizing use of the overflow resource when the standard resource is engaged;

means for activating the overflow resource when the standard resource is engaged whereby the overflow resource responds to the access request; and means for disabling the overflow resource when the request is satisfied.

18. The system of claim 17, further comprising:

means for disabling the overflow resource when the standard resource becomes available.

19. The system of claim 17, wherein the means for authorizing further comprises:

means for restricting an amount of use of the overflow resource.

20. The system of claim 19, wherein the means for restricting further comprises:

means for licensing the overflow resource if the amount of use of the overflow resource exceeds a predetermined amount.

21. The system of claim 19, wherein the means for restricting further comprises:

means for allocating another overflow resource to the system;

means for authorizing use of said another overflow resource when the amount of use of the overflow resource exceeds a predetermined amount;

means for activating said another overflow resource whereby said another overflow resource responds to the access request; and means for disabling said another overflow resource when the request is satisfied.

22. The system of claim 21, wherein the means for authorizing further comprises:

means for restricting an amount of use of said another overflow resource.

23. The system of claim 22, wherein the means for restricting further comprises:

means for licensing both overflow resource and said another overflow resource if the amount of use of said another overflow resource exceeds a predetermined amount.

24. The system of claim 17, further comprising:
   means for restricting the use of the overflow resource to a predetermined amount; and
   means for monitoring the use of the overflow resource to determine if the amount is exceeded.

25. The system of claim 24, wherein the predetermined amount has units of time.

26. The system of claim 24, wherein the predetermined amount represents a maximum number of uses that the overflow resource may be used.

27. The system of claim 24, wherein the predetermined amount represents a maximum amount of time that the overflow resource may be used.

28. The system of claim 24, wherein the predetermined amount represents a maximum number of uses that the overflow resource may be used per a unit of time.

29. The system of claim 24, wherein the predetermined amount represents a maximum number of uses that the overflow resource may be used per a windowed average time unit.

30. The system of claim 24, wherein the predetermined amount represents both a maximum number of uses that the overflow resource may be used and a maximum amount of time that the overflow resource may be used.

31. The system of claim 17, further comprising:
   means for configuring the standard resource for average system use; and
   means for configuring the overflow resource for peak system use.

32. The system of claim 17, wherein the means for authorizing comprises a device selected from the group consisting of:
   means for enabling a hardware dongle, means for releasing a key to decrypt an encrypted file, and means for unlocking a background process.

33. A method for using an overflow resource of a system on a temporary basis to satisfy a request to access system resources, the method comprising the steps of:
   determining whether the system resources are available;
   distributing the request to the system resources if available;
   activating the overflow resource if the system resources are not available;
   distributing the request to the overflow resource if the overflow resource is activated; and
   de-activating the overflow resource when the request is satisfied.

34. The method of claim 33, further comprising the step of:
   de-activating the overflow resources when the system resource is available.

35. The method of claim 33, further comprising the step of:
   receiving a request to access the system resource.

36. The method of claim 1, wherein said standard resource is telephone lines; and
   wherein said overflow resource is additional telephone lines.

37. The method of claim 8, further comprising the step of:
   converting the overflow resource to a standard resource if said predetermined amount is exceeded.

38. The method of claim 1, further comprising the steps of:
   restricting the use of the overflow resource to a predetermined amount for a first overflow state;
   monitoring the use of the overflow resource to determine if said predetermined amount is exceeded; and
   switching to a different overflow state if said predetermined amount is exceeded.

39. The method of claim 38, wherein said different overflow state is charged at a different rate than said first overflow state.

40. The method of claim 1, wherein said standard resource is ports configured for voice interactive functions; and
   wherein said overflow resource is additional ports for voice interactive functions.

41. The method of claim 33, wherein said system resources are standard system ports; and
   wherein said overflow resource is overflow ports.

42. The method of claim 33, wherein said system is a telephony system.

43. The method of claim 41, wherein said standard system ports are ports configured for voice interactive functions; and
   wherein said overflow ports are additional ports for voice interactive functions.

44. The method of claim 41, wherein said standard system ports and said overflow ports consist of at least one of the following:
   a telephone link to a telephony system, a telephone link to a modem-based computer system, a link to a LAN, a link to an ISDN, a link to an intranet, or a link to the internet.

45. The method of claim 33, further comprising the steps of:
   restricting the use of the overflow port to a predetermined amount;
   monitoring the use of the overflow port to determine if said predetermined amount is exceeded.

46. The method of claim 45, further comprising the step of:
   converting the overflow port to a standard system port if said predetermined amount is exceeded.

47. A method for providing a telephony system with an overflow telephony resource on a temporary basis to supplement a standard telephony resource that allows the telephony system to satisfy a telephony resource access request, the method comprising the steps of:
   allocating the overflow telephony resource to the telephony system;
   monitoring the standard telephony resource to determine if the standard telephony resource is engaged when the request materializes;
   authorizing use of the overflow telephony resource when the standard telephony resource is engaged;
   activating the overflow telephony resource whereby the overflow telephony resource responds to the access request; and
   disabling the overflow telephony resource when the request is satisfied.

48. A voice activated telephony system, having a basic telephony function and voice interactive function, that uses an additional number of ports for voice interactive functions on a temporary basis to supplement a standard number of ports configured for voice interactive functions, that allows the system to satisfy an access request to voice interactive functions, the system comprising:
   means for allocating the additional ports for voice interactive functions to the system;
   means for monitoring the standard ports configured for voice interactive functions to determine if the standard ports are engaged when the request materializes;
   means for authorizing use of the additional ports for voice interactive functions when the standard ports configured for voice interactive functions are engaged;

means for activating the additional ports for voice interactive functions whereby the additional ports respond to the access request; and means for disabling the additional ports for voice interactive functions when the request is satisfied.

49. The system of claim 48, wherein the voice interactive functions comprise voice recognition resources and voice annunciator resources.

* * * * *